(12) United States Patent
Schmidt et al.

(10) Patent No.: US 10,563,892 B2
(45) Date of Patent: Feb. 18, 2020

(54) METHOD AND SYSTEM FOR ESTIMATING LOSS OF REFRIGERANT CHARGE IN A REFRIGERANT VAPOR COMPRESSION SYSTEM

(71) Applicant: DANFOSS A/S, Nordborg (DK)

(72) Inventors: Frede Schmidt, Sønderborg (DK); Kristian Fredslund, Haderslev (DK); Jan Prins, Nordborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 15/501,534

(22) PCT Filed: Aug. 21, 2015

(86) PCT No.: PCT/EP2015/069225
§ 371 (c)(1),
(2) Date: Feb. 3, 2017

(87) PCT Pub. No.: WO2016/050415
PCT Pub. Date: Apr. 7, 2016

(65) Prior Publication Data
US 2017/0219263 A1    Aug. 3, 2017

(30) Foreign Application Priority Data
Oct. 1, 2014 (DK) .................................. 2014 00559

(51) Int. Cl.
*F25B 45/00* (2006.01)
*F25B 49/00* (2006.01)
(Continued)

(52) U.S. Cl.
CPC .............. *F25B 45/00* (2013.01); *F25B 49/00* (2013.01); *F25B 49/005* (2013.01); *F25B 49/02* (2013.01); *F25B 2400/16* (2013.01); *F25B 2400/19* (2013.01); *F25B 2500/19* (2013.01); *F25B 2500/222* (2013.01); *F25B 2700/04* (2013.01); *G01K 13/00* (2013.01)

(58) Field of Classification Search
CPC ......... G01K 13/00; F25B 45/00; F25B 49/00; F25B 49/005; F25B 49/02; F25B 2400/16;
(Continued)

(56) References Cited

U.S. PATENT DOCUMENTS 5,214,918 A * 6/1993 Oguni .................... F25B 13/00
                                                      62/126
5,526,649 A * 6/1996 Sada ......................... F24F 1/26
                                                      62/175
(Continued)

FOREIGN PATENT DOCUMENTS

CA      2777349 C   * 1/2015 ............ F25B 49/005
CN    101156033 A     4/2008
(Continued)

OTHER PUBLICATIONS

International Search Report for PCT Serial No. PCT/EP2015/069225 dated Oct. 26, 2015.

*Primary Examiner* — Edward F Landrum
*Assistant Examiner* — Chang H. Park
(74) *Attorney, Agent, or Firm* — McCormick, Paulding & Huber PLLC (57) ABSTRACT

A level sensor is configured to provide a receiver level indicating an amount of the refrigerant present in the receiver and a level model provides a heat rejecting heat exchanger estimate indicating an amount of the refrigerant present in the heat rejecting heat exchanger based on a temperature of the refrigerant. From the sensor and the model, a loss of refrigerant from the refrigerant vapor compression system is estimated.

17 Claims, 4 Drawing Sheets

(51) Int. Cl.
*F25B 49/02* (2006.01)
*G01K 13/00* (2006.01)

(58) Field of Classification Search
CPC .............. F25B 2400/19; F25B 2500/19; F25B 2500/22; F25B 2500/221; F25B 2500/222; F25B 2600/05; F25B 2700/04; F25B 2700/2116
See application file for complete search history.

(56) References Cited

U.S. PATENT DOCUMENTS

| | | | |
|---|---|---|---|
| 7,954,333 B2 * | 6/2011 | Yoshimi | F24F 3/065 62/127 |
| 2006/0021362 A1 | 2/2006 | Sadegh et al. | |
| 2006/0162353 A1 * | 7/2006 | Ha | F25B 13/00 62/149 |
| 2009/0025406 A1 * | 1/2009 | Yoshimi | F25B 13/00 62/127 |
| 2010/0300129 A1 | 12/2010 | Bean, Jr. et al. | |
| 2011/0308267 A1 * | 12/2011 | Tamaki | F25B 45/00 62/222 |

FOREIGN PATENT DOCUMENTS

| | | |
|---|---|---|
| CN | 101216231 A | 7/2008 |
| CN | 101512255 A | 8/2009 |
| CN | 102016458 A | 4/2011 |
| CN | 102378884 A | 3/2012 |
| CN | 102472538 A | 5/2012 |
| JP | 2009210148 A * | 9/2009 |

* cited by examiner

METHOD AND SYSTEM FOR ESTIMATING LOSS OF REFRIGERANT CHARGE IN A REFRIGERANT VAPOR COMPRESSION SYSTEM

CROSS-REFERENCE TO RELATED APPLICATIONS

This application is a National Stage application of International Patent Application No. PCT/EP2015/069225, filed on Aug. 21, 2015, which claims priority to Danish Patent Application No. PA201400559, filed on Oct. 1, 2014, each of which is hereby incorporated by reference in its entirety.

TECHNICAL FIELD

The present invention relates to a method and a system for estimation of loss of a refrigerant charge in a Refrigerant vapor compression system, in the following referred to as RVCS, e.g. in a refrigeration system or in a heat pump based heating system etc.

Particularly, the invention relates to a method and a system for a RVCS system comprising a refrigerant circulating in the loop between a low pressure side and a high pressure side. The low pressure side of the system forms a volume for the refrigerant between an expansion valve and a suction side of a compressor. The high pressure side forms a volume for the refrigerant between a discharge side of the compressor and the expansion valve. The high pressure side comprises a heat rejecting heat exchanger, e.g. in the form of a gas cooler or a condenser which during use becomes warm. The high pressure side further comprises a receiver providing storage space for the refrigerant. The low pressure side comprises an evaporator which during use becomes cold.

BACKGROUND

Refrigeration systems e.g. in supermarkets and cooling stores are generally losing their refrigerant charge at a slow rate. Typical numbers rate 10-30% of the total charge per year. This eventually leads to failure due to a lack of refrigerant.

To compensate for the lost refrigerant and to avoid failures, fixed service intervals are typically defined.

The refrigerant is partly present in the form of liquid and partly in form of vapor. The amount of liquid in the evaporators and the heat rejecting heat exchanger varies dramatically depending on operating conditions and particularly on temperatures, pressures, and load.

The refrigerant migrates during normal operation. Most RVCS systems will therefore comprise a receiver that stores an amount of refrigerant to accommodate the variations in charge in the other parts of the plant. This makes it virtually impossible to estimate the charge under normal running conditions.

Similar considerations apply in other technically similar systems, e.g. in heat pump systems for domestic heating and in air condition systems etc. Herein, use of the term RVCS system encompass any kind of compressor and refrigerant based system where thermal energy is exchanged between a warm and a cold side by use of a compressor and a refrigerant. Such systems are sometimes referred to as refrigerant vapor compression systems.

There is great interest in the market for early detection of low charge conditions which would make it possible to schedule re-charging before the failure actually occurs. This may reduce the amount of failures and prevent the need for emergency service calls.

During refilling, the service personnel refill the system with a roughly estimated amount of refrigerant. Current practice is very imprecise, and typically focused on avoiding over-filling the system since this may cause costly breakdown of the compressor if liquid refrigerant escapes from the evaporator.

SUMMARY

To improve RVCS systems and particularly to enable improved service intervals, to improve the quality of the service and refilling procedure, and to reduce the risk of failures, the present invention, in a first aspect, provides a method comprising:
  providing a level sensor configured to provide a receiver level indicating an amount of the refrigerant present in the receiver;
  providing a level model configured to provide a heat rejecting heat exchanger estimate indicating an amount of the refrigerant present in the heat rejecting heat exchanger based on a parameter selected from a group of operating parameters which includes at least a temperature of the refrigerant; and
  estimating a loss of refrigerant from the RVCS system based on the receiver level and the heat rejecting heat exchanger estimate.

In a second aspect, the invention provides a controller for an RVCS system of the above described kind and comprising a processor operating on a set of instructions to become configured to execute the method according to the first aspect of the invention.

In a third aspect, the invention provides an RVCS system, particularly a refrigeration system, and particularly a refrigeration system with a plurality of cooling units or shelves which are individually cooled down by a supply of refrigerant from a compressor or a compressor rack which includes a plurality of compressors. The RVCS system according to the third aspect of the invention is provided with a controller according to the second aspect of the invention.

In the following, the invention is mainly described with reference to a refrigeration system. However, any of the disclosed features and aspects are applicable generally in a RVCS system, e.g. of the kind charged with fluorocarbon refrigerants such as, but not limited to, hydrochlorofluorocarbons (HCFCs), such as R22, or hydrofluorocarbons (HFCs), such as R134a, R410A and R407C, or hydrocarbons (HCs) such as R600a and R1270, or carbon dioxide.

By executing a procedure known as a pump down, it is possible to obtain a reproducible amount of refrigerant inside most of the components of the RVCS. Here reproducible is to be understood in the sense that the amount of refrigerant inside these components will be substantially the same when the procedure is repeated. The only components for which the amount of refrigerant will not be reproducible are the heat rejecting heat exchanger and the receiver. Thus the change in the amount of refrigerant in the receiver plus the change in the amount of refrigerant in the heat ejecting heat exchanger after execution of a pump down procedure corresponds to a loss of refrigerant from the RVCS.

The amount of refrigerant in the receiver can be determined by means of a level sensor, leaving the heat rejecting heat exchanger as the only part of the system with a high uncertainty in the charge. By the present invention, this is overcome by estimation using a model of the heat rejecting heat exchanger. The sum of the level in the receiver and the estimated amount in the heat rejecting heat exchanger is expected to remain constant for a leak free plant and to drop over time when there is leakage. By establishing a base line, i.e. by establishing a signal from the level sensor and by providing a heat rejecting heat exchanger estimate from the level model directly after charging, preferably less than one day or one hour after charging, the amount of charge lost can be estimated sufficiently precise to highly improve the timing of the service intervals, and to ensure a more correct amount of added refrigerant.

The method could be applied for estimating service intervals, or it could be applied for estimating an amount of refrigerant which is necessary for charging a specific RVCS system. This will enable the service personnel to bring the necessary amount when servicing a system, and it will be possibly to allow the service personnel to fill more refrigerant into the system than until now where the amount is very roughly and imprecisely estimated and where the amount is therefore reduced to include a safety measure to avoid damaging the compressor by overfilling.

The mentioned RVCS system comprising a refrigerant circulating in the loop could be a regular refrigeration system, e.g. a large system comprising a plurality of compressors, and/or a plurality of heat rejecting heat exchangers and/or a plurality of receivers and/or a plurality of expansion valves and/or a plurality of evaporators. The system could e.g. be for a cold store, or it could form part of an RVCS system (air conditioning system or a heat pump based heating system). The compressor could e.g. be a reciprocating compressor or scroll compressor.

The system may therefore comprise one or more low pressure sides and one or more high pressure sides.

The heat rejecting heat exchanger could be a traditional condenser in which refrigerant in gas phase is cooled down and becomes liquid, or it may be a gas cooler of the kind known e.g. from $CO_2$ based systems.

In one embodiment, the method comprises applying different level models for different heat rejecting heat exchangers in the system.

The low pressure side may comprise a number of different components, including an evaporator into which the refrigerant is expanded and thereby becomes cold. The evaporator is located between one or more expansion valves and a suction side of the compressor(s).

The high pressure side comprises one or more heat rejecting heat exchanger and one or more receivers located between the discharge of the compressor and the expansion valve. The high pressure side may include additional components.

The level sensor may be any kind of traditional sensor known in the art to be suitable for level indication in a RVCS system. The level sensor typically converts the liquid level into an electrical signal, e.g. 0 to 10 Volt, which can be read by a controller, and it may preferably be located directly inside the receiver.

The level model which is configured to provide the heat rejecting heat exchanger estimate may particularly be a function of at least the temperature of the refrigerant and possibly also a function of other parameters, e.g. pressure, e.g. a function of a pressure difference between pressures at different locations in the system.

The level model will estimate the amount of liquid refrigerant in the heat rejecting heat exchanger.

One possible model that is applicable in subcritical operation divides the heat rejecting heat exchanger in three sections. In region 1, between boundaries 0 and 1, the hot vapor coming from the compressor is cooled down to the dew point. In region 2, between boundaries 1 and 2, the refrigerant is condensed into liquid. In region 3, between boundaries 2 and 3, the liquid refrigerant is cooled down further, c.f. also FIG. 4.

Figure 4:
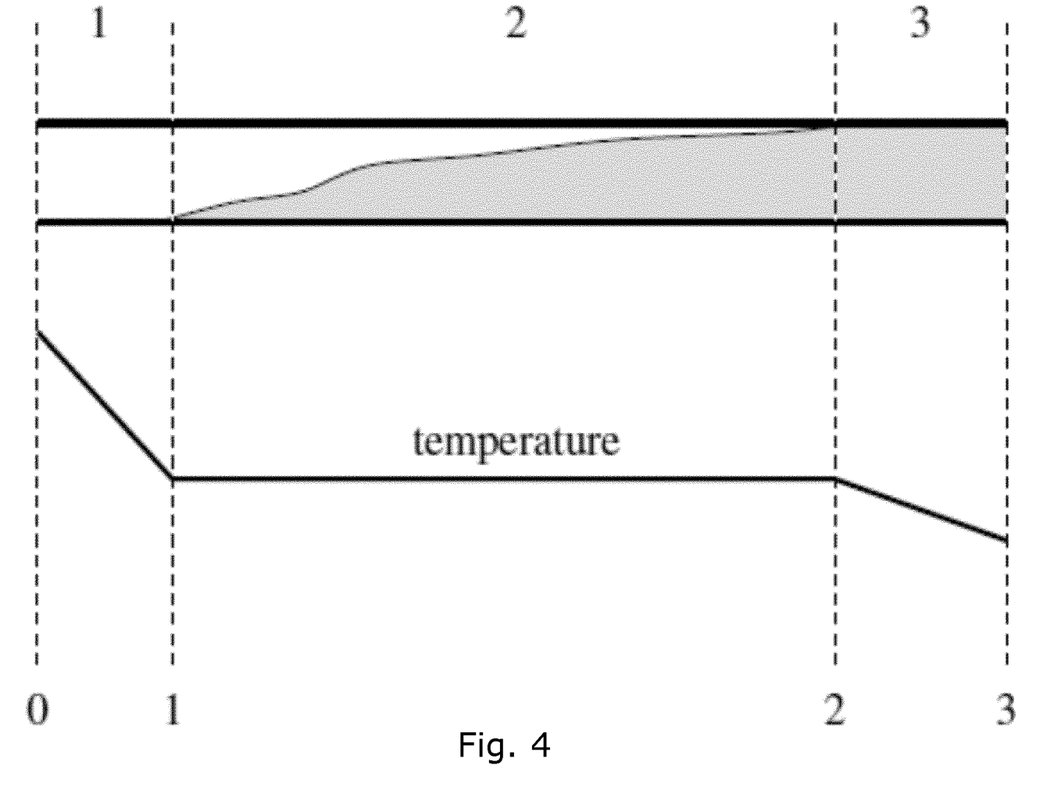
FIG. 4 illustrates the basis of a model of a condenser.

A practical estimation formula for such a model is:

$$\xi = \frac{\sum \frac{(h_i - h_{i-1})}{\alpha_i((T_i + T_{i-1}) - 2T_{amb})}(\zeta_i \rho_g + (1-\zeta_i)\rho_L)}{\rho_L \sum \frac{(h_i - h_{i-1})}{\alpha_i((T_i + T_{i-1}) - 2T_{amb})}}$$

In which $h_i$ is the mass specific enthalpy of the refrigerant at boundary i, $\rho_L$ is the liquid density, $\rho_g$ is the vapour density, $T_i$ is the temperature at boundary i, $T_{amb}$ is the temperature of the secondary fluid, $\alpha_i$ is the heat transfer coefficient representative for region i, and $\zeta_i$ is the fraction of the volume of region i that is filled with vapour (which equals one in region 1 and zero in region 3). The enthalpies and densities can be computed by means of a fluid model. The result of the model is the mass of refrigerant inside the heat rejecting heat exchanger relative to the mass that would be inside when the condenser would be entirely filled with liquid refrigerant. The total refrigerant mass inside the heat rejecting heat exchanger can thus be obtained by multiplying the result by the internal volume of the heat rejecting heat exchanger and by the liquid density.

The heat transfer is specific for the heat rejecting heat exchanger in question, and it can be found by experiments. In the table below, examples of heat transfer coefficients are provided.

| Air cooled condensers | $\frac{W}{m^2K}$ |
| --- | --- |
| lamella condenser, entire region | 20-35 |
| Hydrocarbon gas | 200-450 |
| Condensation of organic vapors | 350-500 |
| liquid Hydrocarbon | 400-550 |

The method may particularly be applied in a system with a plurality of heat rejecting heat exchangers. The method may thus comprise the step of providing for each heat rejecting heat exchanger a specific, individual level model configured to provide a heat rejecting heat exchanger estimate indicating an amount of the refrigerant present in a specific one of the heat rejecting heat exchangers. For this purpose, each model may use different heat transfer coefficients depending on the specific type of heat rejecting heat exchanger.

Figure 2:
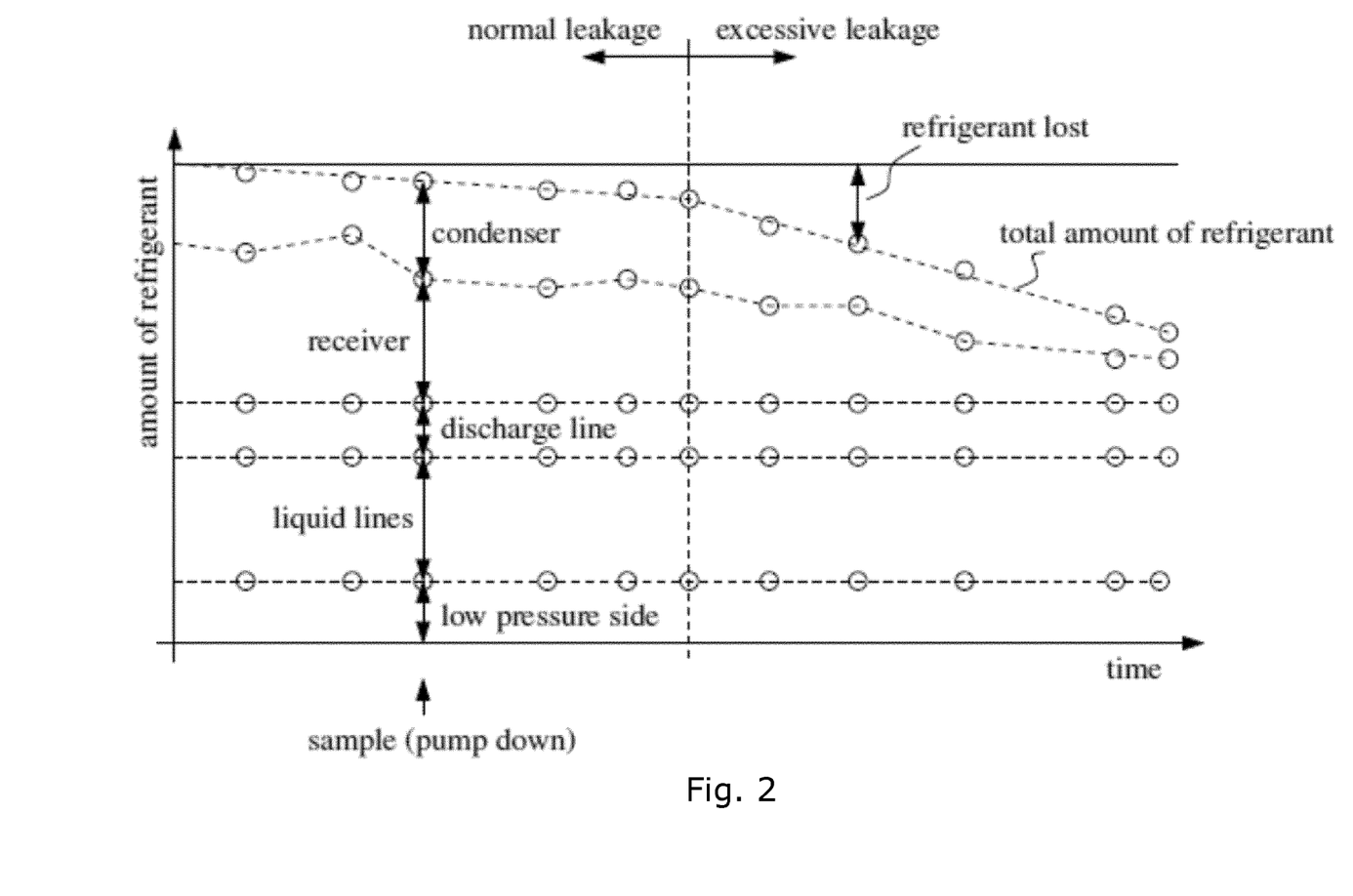
FIG. 2 illustrates how the refrigerant may be distributed inside the components of the RVCS and how successively obtained samples lead to an estimates of the amount of refrigerant lost and of the rate at which refrigerant is lost.

The system may particularly be operated such that the refrigerant is distributed between the low pressure side and the high pressure side in a reproducibly manner prior to the estimation of the loss of refrigerant. A pumpdown is when a valve controlling flow of refrigerant into the evaporator(s) is closed and the compressor reduces the pressure in the low pressure side well below normal operating pressure and thereby evaporates all refrigerant that is present in the low pressure side. Thus the amount of refrigerant present in the low pressure side will be reproducible. This leads to a few refrigerant estimation assumptions depicted in FIG. 2.

The prevention of a flow of the refrigerant into the evaporator(s) may be controlled by a computer controllable valve such that the entire process of estimating the loss of refrigerant can be carried out by use of a microprocessor configured to control operation of or receive signals from the level sensor, a temperature sensor, the controllable valve, and the compressor.

A first liquid line between the heat rejecting heat exchanger and the receiver and a second liquid line between the receiver and the expansion valve is filled with refrigerant in liquid form prior to the estimation of the loss of refrigerant. This applies to some of the available refrigerants, but not e.g. to $CO_2$ which will typically be present in vapor form throughout the high pressure side. The first and second liquid lines may e.g. be filled with liquid refrigerant but a discharge line between the discharge side of the compressor and the heat rejecting heat exchanger is filled with refrigerant in gas phase.

An alert may be communicated to an operator or to service personnel based on the estimated loss of refrigerant. The alert may be communicated as a signal directly from the aforementioned microprocessor.

A comparable refrigerant level or leak rate may be provided. As an example, the method may include comparing an estimate with an estimate obtained from a well-functioning system, e.g. an estimate obtained when the system was new. By comparing the estimated loss of refrigerant from the RVCS system to the comparable system leak rate, the method may provide an increase of leak rate over time or provide indication of deterioration of the system, and the method may thus include indication of an expected remaining lifetime of the entire system or of specific components in the system, e.g. provided as an integer, e.g. a number within a range.

The comparable system leak rate could be an average value of the loss of refrigerant from the system.

The group of operating parameters may consist of: a temperature of the refrigerant in the heat rejecting heat exchanger, a pressure in the heat rejecting heat exchanger, a suction pressure at the compressor, a temperature of a secondary fluid flowing through the heat rejecting heat exchanger, and a temperature at the evaporator.

The loss is estimated by comparing a total level with an expected level, where the total level constitutes a sum of the receiver level and the heat rejecting heat exchanger estimate.

The receiver level could be provided in a specific unit, and where the level model provides estimation of a proportionality constant configured to convert an amount in the refrigerant in the heat rejecting heat exchanger to the specific unit.

The method may comprise the step of estimating an amount of refrigerant in a discharge line which connects the compressor and the condenser.

The loss of refrigerant from the RVCS system could particularly be estimated real-time, e.g. while the compressor is operated and preferably fully automatic by a microprocessor without human intervention.

The method may further comprise the step of changing the level of the refrigerant charge in the RVCS system based on the estimated loss.

BRIEF DESCRIPTION OF THE DRAWINGS

In the following, the invention will be described in further details with reference to embodiments and with reference to the drawings in which.

DETAILED DESCRIPTION

It should be understood that the detailed description and specific examples, while indicating embodiments of the invention, are given by way of illustration only, since various changes and modifications within the spirit and scope of the invention will become apparent to those skilled in the art from the detailed description.

Figure 1:
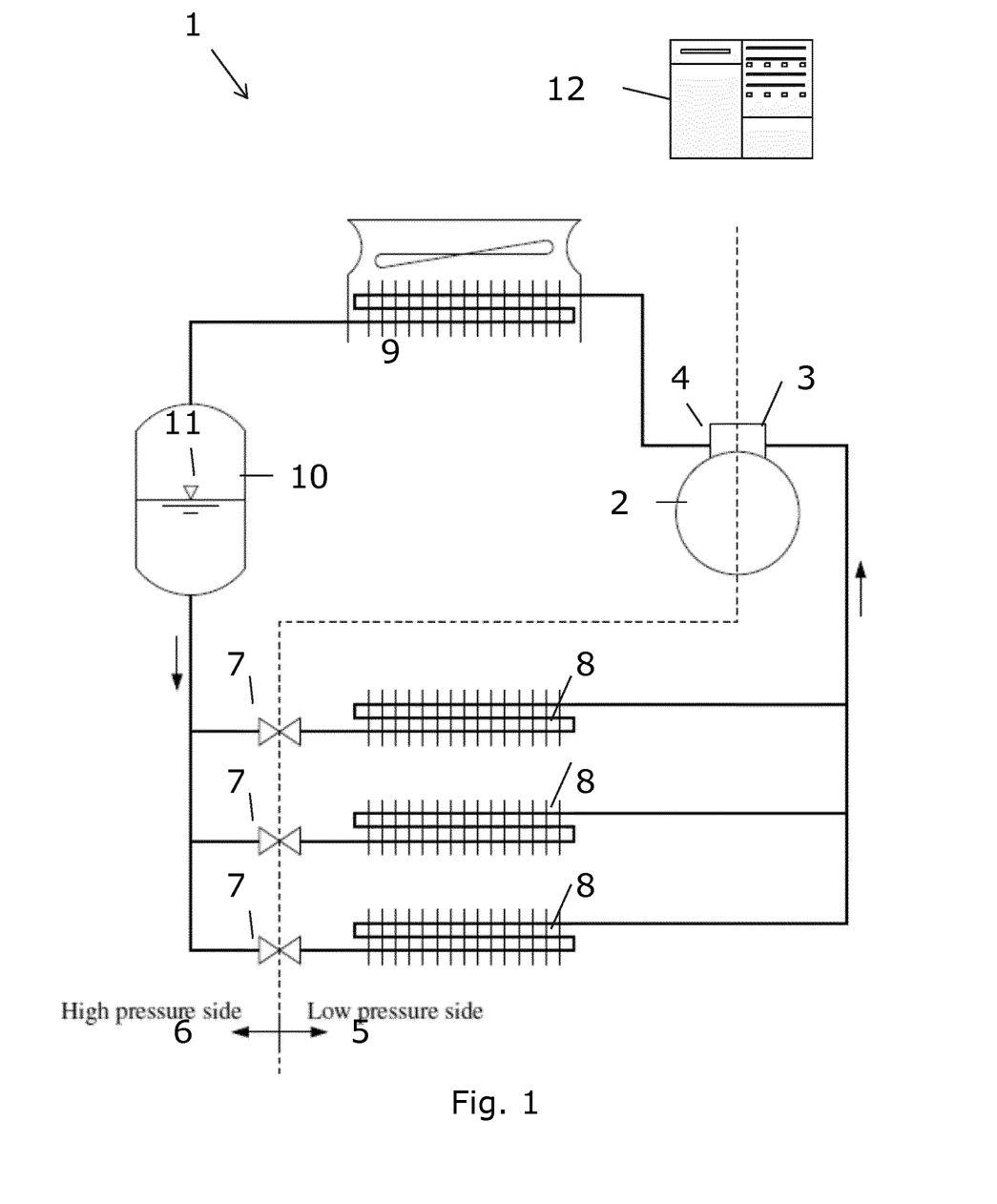
FIG. 1 illustrates a system according to the invention.

FIG. 1 illustrates a RVCS system 1 including a compressor 2 having a suction side 3 and a discharge side 4. A refrigerant circulates in a loop between a low pressure side 5 and a high pressure side 6 separated by the compressor and by the expansion valve(s) 7. The compressor could be a reciprocating compressor, a scroll compressor, a screw compressor or any other kind of compressor known for a RVCS system, or the compressor could be constituted by a rack including a plurality of serial or parallel coupled compressors.

The system includes an evaporator or a plurality of evaporators 8 which absorb thermal energy from the environment and evaporates the refrigerant. The system further includes a heat rejecting heat exchanger 9 which rejects thermal energy from the refrigerant to the surroundings.

The system further comprises a receiver 10 for storing the refrigerant. The receiver is sometimes referred to as a flash tank or simply a tank. The skilled person would realize that the system may contain any number of evaporators, heat rejecting heat exchangers, receivers, expansion valves, compressors, and the system may further contain a number of additional components, e.g. for preventing moist and freezing, for measuring temperatures and pressures or for controlling distribution of the refrigerant between different evaporators, heat rejecting heat exchangers, receivers, expansion valves, and compressors.

The system may operate in a subcritical or a transcritical cycle. The refrigerant leaves the pressure side of the compressor in a compressed and hot state. In the heat rejecting heat exchanger, the refrigerant is cooled down. It is common practice to refer to a heat rejecting heat exchanger as a condenser in subcritical operation, meaning that liquid is formed inside the heat rejecting heat exchanger, or as a gas cooler in supercritical operation, meaning that the refrigerant inside the gas cooler is in a supercritical state. The compressed refrigerant continues to the receiver which functions as a storage tank. From the receiver the refrigerant continues to the expansion valve where it expands. It then enters the evaporator where it evaporates.

A level sensor 11 is associated with the receiver and a controller 12. The sensor senses the level of refrigerant, e.g. in liquid form, which resides in the receiver and generates an L-signal indicative of the level. The signal is communicated to the controller.

The temperature sensor senses the temperature of refrigerant in the heat rejecting heat exchanger and generates a T-signal indicative of the temperature. The signal is communicated to the controller. Particularly, the temperature at the inlet ($T_0$) and the outlet ($T_3$) as well as the pressure could be determined. The temperatures at the internal boundaries ($T_1$ and $T_2$) may follow from the pressure and from a fluid model, c.f. also FIG. 4. Finally, the temperature of the secondary fluid (T-ambient) could be used. In a refrigeration system, this could be the temperature of air, water, brine or refrigerant which is applied for cooling the heat rejecting heat exchanger.

The controller contains a microprocessor and has data storage capability. The microprocessor operates on a set of instructions which includes a level model configured to provide a heat rejecting heat exchanger estimate indicating an amount of the refrigerant present in the heat rejecting heat exchanger based on the temperature of the refrigerant. The controller uses the model and the L-signal and the T-signal to provide an estimate of the level of refrigerant, and based on the level, the controller calculates a loss of refrigerant from the system.

The controller includes a communication interface configured to dispatch service indication when a limit value for the level of refrigerant is reached or when a limit value for the loss of refrigerant is reached. The communication interface may e.g. dispatch the service indication by internet, by SMS, by audible or readable alert signals etc. The service indication may include an estimated amount of refrigerant which is to be added during the announced service.

The communication interface further allows communication of an initial startup signal to the controller. The startup signal is entered when the RVCS is new, i.e. when a completely empty system is made and when it has just been filled with an exactly known amount of refrigerant. Upon receiving the startup signal, the controller uses the model and the L-signal and the T-signal to provide an estimate of the level of refrigerant. This estimate is marked as a zero-baseline estimate which is considered to represent a fully charged system.

The communication interface further allows the service personnel to communicate a service signal to the controller after repair work or service where the system is charged with additional refrigerant. Upon receiving the service signal, the controller uses the model and the L-signal and the T-signal to provide an estimate of the level of refrigerant. This estimate is marked as a service baseline estimate which is considered to represent an estimated fully charged system.

In one embodiment, the controller throughout the lifetime of the system compares estimates with the zero-baseline estimate and/or with the service baseline estimate when determining an estimate for the loss of refrigerant from the RVCS.

Figure 3:
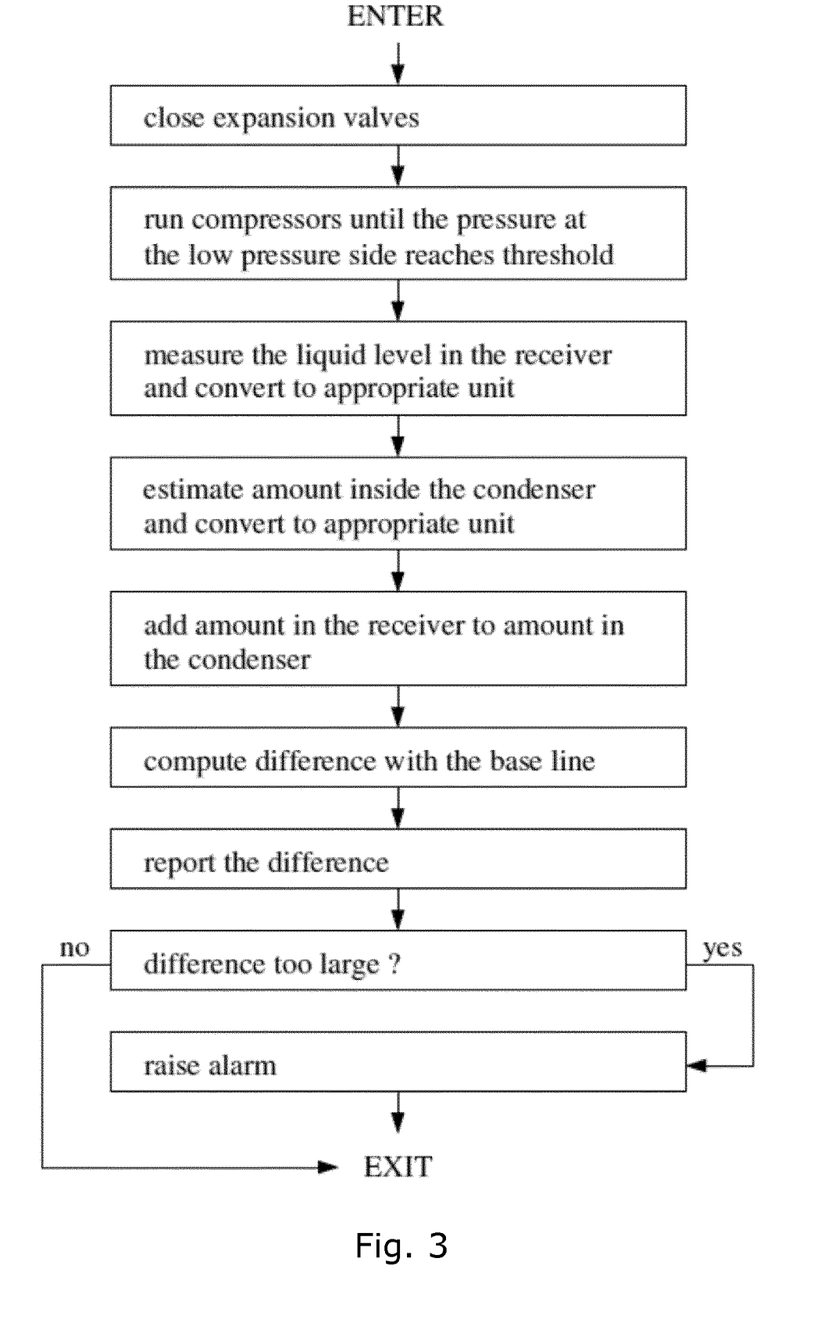
FIG. 3 illustrates how the method could be implemented.

FIG. 3 illustrates functions of a system according to the invention and FIG. 4 illustrates the basis of a model of a condenser c.f. also previous description of the model $$\xi = \frac{\sum \frac{(h_i - h_{i-1})}{\alpha_i((T_i + T_{i-1}) - 2T_{amb})}(\zeta_i \rho_g + (1-\zeta_i)\rho_L)}{\rho_L \sum \frac{(h_i - h_{i-1})}{\alpha_i((T_i + T_{i-1}) - 2T_{amb})}}.$$

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for estimating a level of refrigerant charge in a refrigerant vapor compression system which comprises a refrigerant circulating in a loop between a low pressure side and a high pressure side, the low pressure side forming a volume for the refrigerant between an expansion valve and a suction side of a compressor and the high pressure side forming a volume for the refrigerant between a discharge side of the compressor and the expansion valve, the high pressure side comprising a heat rejecting heat exchanger and a receiver, and the low pressure side comprising an evaporator, the method comprising:
   providing a level sensor configured to provide a receiver level indicating an amount of the refrigerant present in the receiver;
   providing a level model configured to provide a heat rejecting heat exchanger estimate indicating an amount of the refrigerant present in the heat rejecting heat exchanger based on a temperature of the refrigerant;
   estimating a loss of refrigerant from the refrigerant vapor compression system based on the receiver level and the heat rejecting heat exchanger estimate; and
   making pump down by operating the compressor until the low pressure side contains no liquid refrigerant prior to the estimation of the loss of refrigerant;
   wherein the receiver level and the heat rejecting heat exchanger estimate in the estimating a loss of refrigerant step are obtained when the low pressure side contains no liquid refrigerant due to the making pump down step.

2. The method according to claim 1, wherein the refrigerant vapor compression system comprises a plurality of heat rejecting heat exchangers, the method further comprising providing for each heat rejecting heat exchanger a specific level model configured to provide a heat rejecting heat exchanger estimate indicating an amount of the refrigerant present in a specific one of the heat rejecting heat exchangers.

3. The method according to claim 2, where the refrigerant vapor compression system is operated such that the refrigerant is distributed between the low pressure side and the high pressure side in a reproducible manner prior to the estimation of the loss of refrigerant.

4. The method according to claim 1, where the refrigerant vapor compression system is operated such that the refrigerant is distributed between the low pressure side and the high pressure side in a reproducible manner prior to the estimation of the loss of refrigerant.

5. The method according to claim 1, where the pump down comprises the step of preventing a flow of the refrigerant into the evaporator while simultaneously operating the compressor such that the refrigerant in the low pressure side is reduced to a reproducible amount prior to the estimation of the loss of refrigerant.

6. The method according to claim 1, further comprising the step of providing an alert to an operator based on the estimated loss of refrigerant.

7. The method according to claim 1, wherein the estimated loss is a value, the method further comprising providing a comparable system leak rate value which specifies a loss of refrigerant from a reference system and comparing the estimated loss value of refrigerant from the refrigerant vapor compression system to the comparable system leak rate value.

8. The method according to claim 7, where the comparable system leak rate is an average value of the loss of refrigerant from the refrigerant vapor compression system over time.

9. The method according to claim 8, where the comparable system leak rate is a previously estimated loss of refrigerant from the refrigerant vapor compression system to determine an increase of leak rate over time.

10. The method according to claim 1, where the loss is estimated by comparing a total level with an expected level, where the total level constitutes a sum of the receiver level and the heat rejecting heat exchanger estimate.

11. The method according to claim 1, where the loss of refrigerant from the refrigerant vapor compression system is estimated while the compressor is operated.

12. The method according to claim 1, further comprising the step of changing the level of the refrigerant charge in the refrigerant vapor compression system based on the estimated loss.

13. A controller for a refrigerant vapor compression system which comprises a compressor, a heat rejecting heat exchanger, a receiver, and an evaporator connected in a loop, and a refrigerant circulating in the loop, the controller comprising a processor operating on a set of instructions, and where the instructions are configured to execute the method according to claim 1.

14. A refrigerant vapor compression system comprising a compressor, a heat rejecting heat exchanger, a receiver, and an evaporator connected in a loop, and a refrigerant circulating in the loop, and the controller according to claim 13.

15. A method for estimating a level of refrigerant charge in a refrigerant vapor compression system which comprises a refrigerant circulating in a loop between a low pressure side and a high pressure side, the low pressure side forming a volume for the refrigerant between an expansion valve and a suction side of a compressor and the high pressure side forming a volume for the refrigerant between a discharge side of the compressor and the expansion valve, the high pressure side comprising a heat rejecting heat exchanger and a receiver, and the low pressure side comprising an evaporator, the method comprising:

providing a level sensor configured to provide a receiver level indicating an amount of the refrigerant present in the receiver;

providing a level model configured to provide a heat rejecting heat exchanger estimate indicating an amount of the refrigerant present in the heat rejecting heat exchanger based on at least one operating parameter of a group of operating parameters, the group of operating parameters comprising a temperature of the refrigerant in the heat rejecting heat exchanger, a pressure in the heat rejecting heat exchanger, a suction pressure at the compressor, a temperature of a secondary fluid flowing through the heat rejecting heat exchanger, and a temperature at the evaporator;

estimating a loss of refrigerant from the refrigerant vapor compression system based on the receiver level and the heat rejecting heat exchanger estimate; and making pump down by operating the compressor until the low pressure side contains no liquid refrigerant prior to the estimation of the loss of refrigerant;

wherein the receiver level and the heat rejecting heat exchanger estimate in the estimating a loss of refrigerant step are obtained when the low pressure side contains no liquid refrigerant due to the making pump down step.

16. The method according to claim 15, wherein the receiver level in the estimating a loss of refrigerant step is indicating an amount of the refrigerant present in the receiver only when the low pressure side contains no liquid refrigerant due to the making pump down step, and wherein the heat rejecting heat exchanger estimate in the estimating a loss of refrigerant step is indicating an amount of the refrigerant present in the heat rejecting heat exchanger only when the low pressure side contains no liquid refrigerant due to the making pump down step.

17. A method for estimating a level of refrigerant charge in a refrigerant vapor compression system which comprises a refrigerant circulating in a loop between a low pressure side and a high pressure side, the low pressure side forming a volume for the refrigerant between an expansion valve and a suction side of a compressor and the high pressure side forming a volume for the refrigerant between a discharge side of the compressor and the expansion valve, the high pressure side comprising a heat rejecting heat exchanger and a receiver, and the low pressure side comprising an evaporator, the method comprising:

providing a level sensor configured to provide a receiver level indicating an amount of the refrigerant present in the receiver;

providing a level model configured to provide a heat rejecting heat exchanger estimate indicating an amount of the refrigerant present in the heat rejecting heat exchanger based on a temperature of the refrigerant;

estimating a loss of refrigerant from the refrigerant vapor compression system based on the receiver level and the heat rejecting heat exchanger estimate; and making pump down by operating the compressor until the low pressure side contains no liquid refrigerant prior to the estimation of the loss of refrigerant;

wherein the receiver level in the estimating a loss of refrigerant step is indicating an amount of the refrigerant present in the receiver only when the low pressure side contains no liquid refrigerant due to the making pump down step; and wherein the heat rejecting heat exchanger estimate in the estimating a loss of refrigerant step is indicating an amount of the refrigerant present in the heat rejecting heat exchanger only when the low pressure side contains no liquid refrigerant due to the making pump down step.

* * * * *